US009444642B2

(12) United States Patent
Matsuhira

(10) Patent No.: US 9,444,642 B2
(45) Date of Patent: Sep. 13, 2016

(54) LAN MULTIPLEXING APPARATUS

(71) Applicant: FUJITSU LIMITED, Kawasaki-shi, Kanagawa (JP)

(72) Inventor: Naoki Matsuhira, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 14/497,419

(22) Filed: Sep. 26, 2014

(65) Prior Publication Data

US 2015/0010007 A1    Jan. 8, 2015

Related U.S. Application Data

(63) Continuation of application No. PCT/JP2012/058176, filed on Mar. 28, 2012.

(51) Int. Cl.
*H04L 12/46* (2006.01)
*H04W 28/06* (2009.01)

(52) U.S. Cl.
CPC ....... *H04L 12/4633* (2013.01); *H04L 12/4641* (2013.01); *H04W 28/06* (2013.01)

(58) Field of Classification Search
CPC ........... H04L 12/4641; H04L 12/4633; H04L 45/00; H04L 29/0653; H04L 49/3009; H04W 40/00; H04W 28/06
USPC .................................................. 370/347–394
See application file for complete search history.

(56) References Cited

U.S. PATENT DOCUMENTS

| 4,739,183 A * | 4/1988 | Tokura ................ B60R 16/0315 307/41 |
| 7,827,292 B2 * | 11/2010 | Chen ................... H04L 12/4641 709/220 |
| 2002/0059637 A1 * | 5/2002 | Rakib ............. G08B 13/19656 725/119 |
| 2003/0088697 A1 | 5/2003 | Matsuhira |
| 2007/0258367 A1 * | 11/2007 | Ikeda ..................... H04L 41/12 370/230 |
| 2010/0223401 A1 | 9/2010 | Matsuhira |
| 2011/0211587 A1 * | 9/2011 | Murakami .......... H04L 12/4633 370/401 |
| 2014/0003437 A1 | 1/2014 | Matsuhira |

FOREIGN PATENT DOCUMENTS

| JP | 2003-169082 A | 6/2003 |
| WO | 01/99354 A1 | 12/2001 |
| WO | 2011/052729 A1 | 5/2011 |

OTHER PUBLICATIONS

Extended European Search Report dated Nov. 28, 2014 for corresponding to European Patent Application No. 12872615.5, 7 pages.
(Continued)

*Primary Examiner* — Afsar M Qureshi
(74) *Attorney, Agent, or Firm* — Fujitsu Patent Center

(57) ABSTRACT

The control device of a LAN multiplexing apparatus performs a process to encapsulate a MAC frame received from at least any one of the LAN and the wireless LAN with a packet header including a packet network address including at least a multiplexing identifier and a MAC address and to send the encapsulated packet to the packet network, and a process to send a MAC frame obtained by decapsulating a packet received from the packet network to at least any one of the LAN and the wireless LAN corresponding to a destination of the MAC frame.

7 Claims, 13 Drawing Sheets

(56) References Cited

OTHER PUBLICATIONS

Saito, Akira et al. "Best-Effort-Type L2-VPN System no Jitsuyoka", NTT Gijutsu Journal, pp. 40-43, vol. 16, No. 4, with English Translation.
Ash Multimedia Lab, "Road to Network Expert, vol. 7—Graphically-Shown New Employee Training on TCP/IP," "Zukai de Wakaru TCP/IP Shinjin Kenshu", Software Design, Apr. 18, 2004, Gijutsu-Hyohron Co., Ltd., pp. 110-115, No. 162, with Partial English Translation.

International Search Report dated May 1, 2012 for corresponding International Application No. PCT/JP2012/058176 (Form PCT/ISA/210), 1 page.
Written Opinion of the International Searching Authority for corresponding International Application No. PCT/JP2012/058176 (Form PCT/ISA/237), May 1, 2012, 4 pages.
Japanese Office Action mailed Dec. 8, 2015 for corresponding Japanese Patent Application No. 2014-507135, with Partial English Translation, 4 pages.
Japanese Office Action mailed Apr. 5, 2016 for corresponding Japanese Patent Application No. 2014-507135, with Partial English Translation, 4 pages.

\* cited by examiner

FIG. 1A

| PREAMBLE | MAC-DA | MAC-SA | TYPE | DATA | FCS |

FIG. 1B

| PREAMBLE | MAC-DA | MAC-SA | LENGTH/TYPE | DATA | FCS |

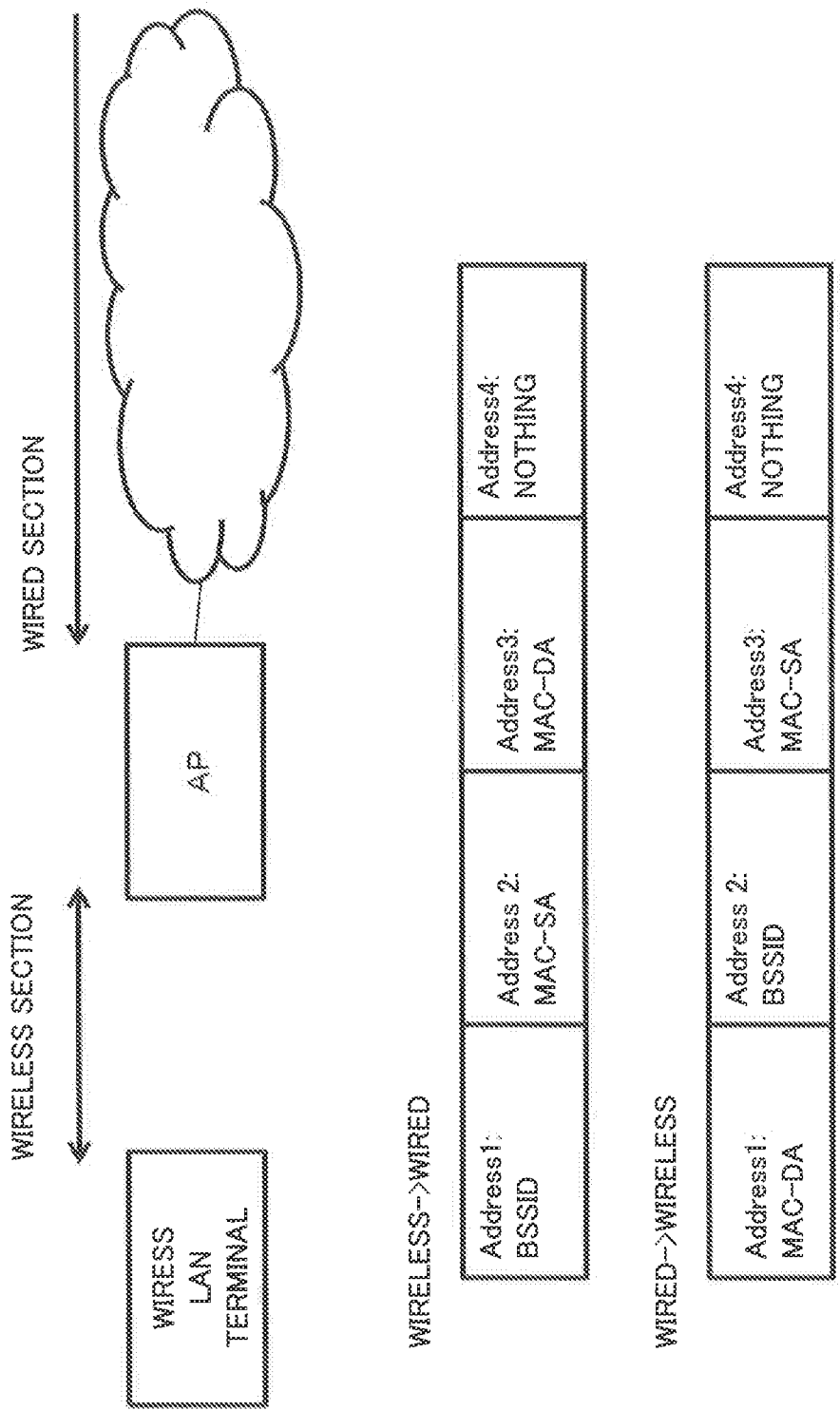

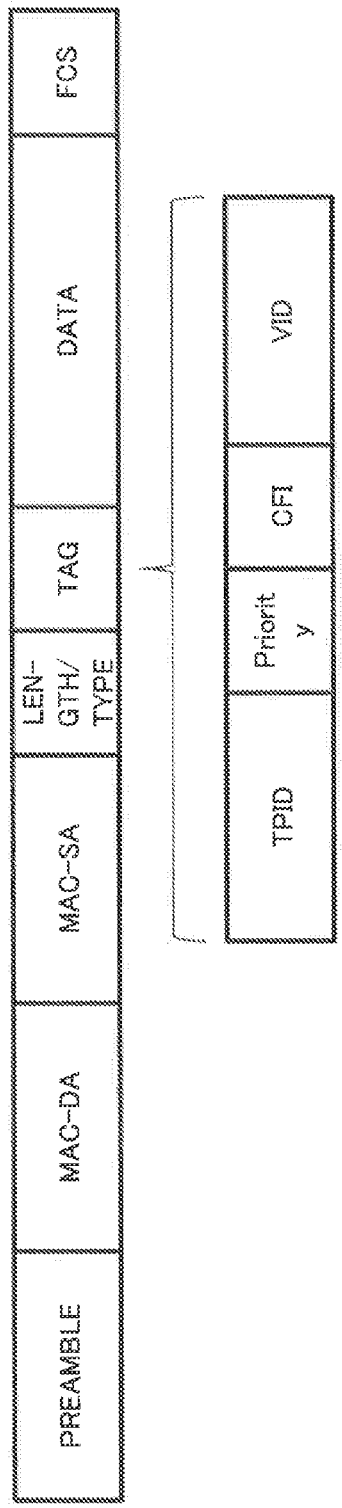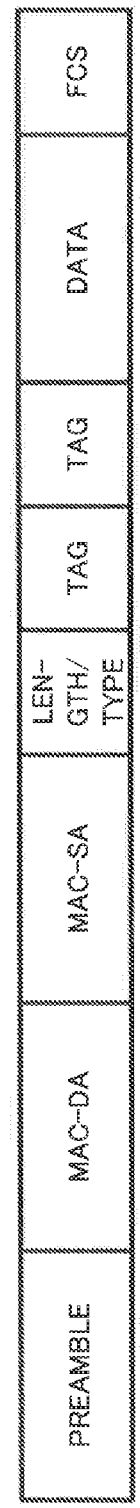

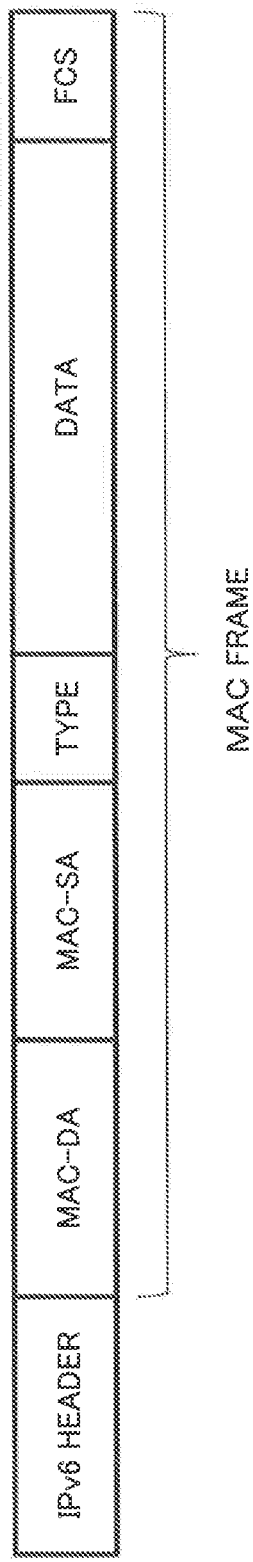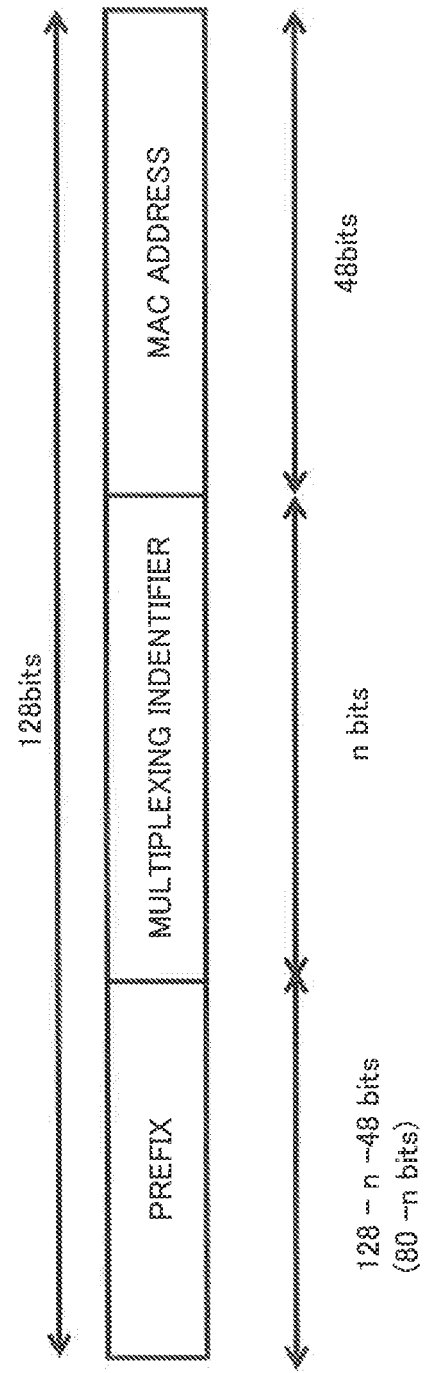

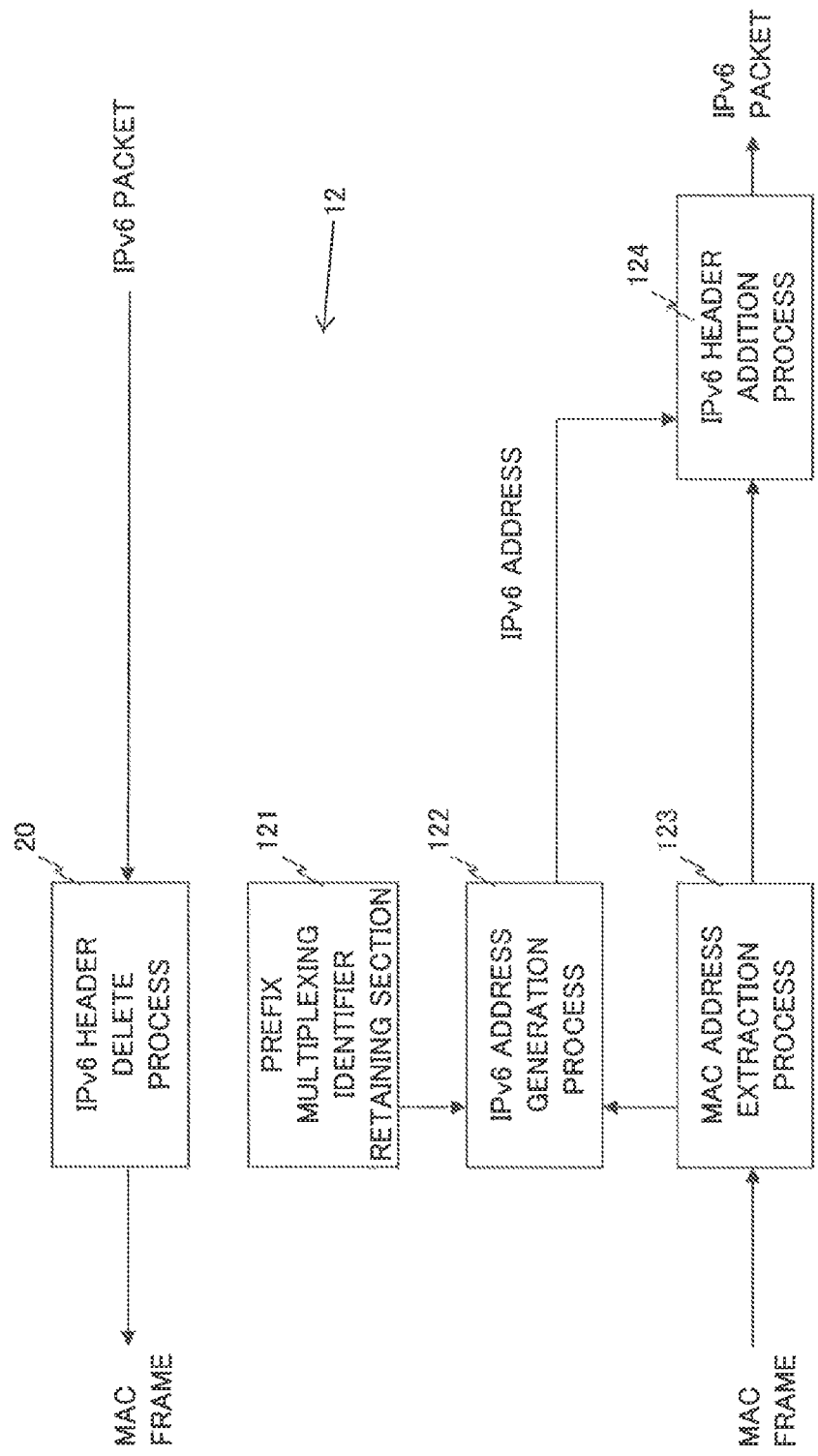

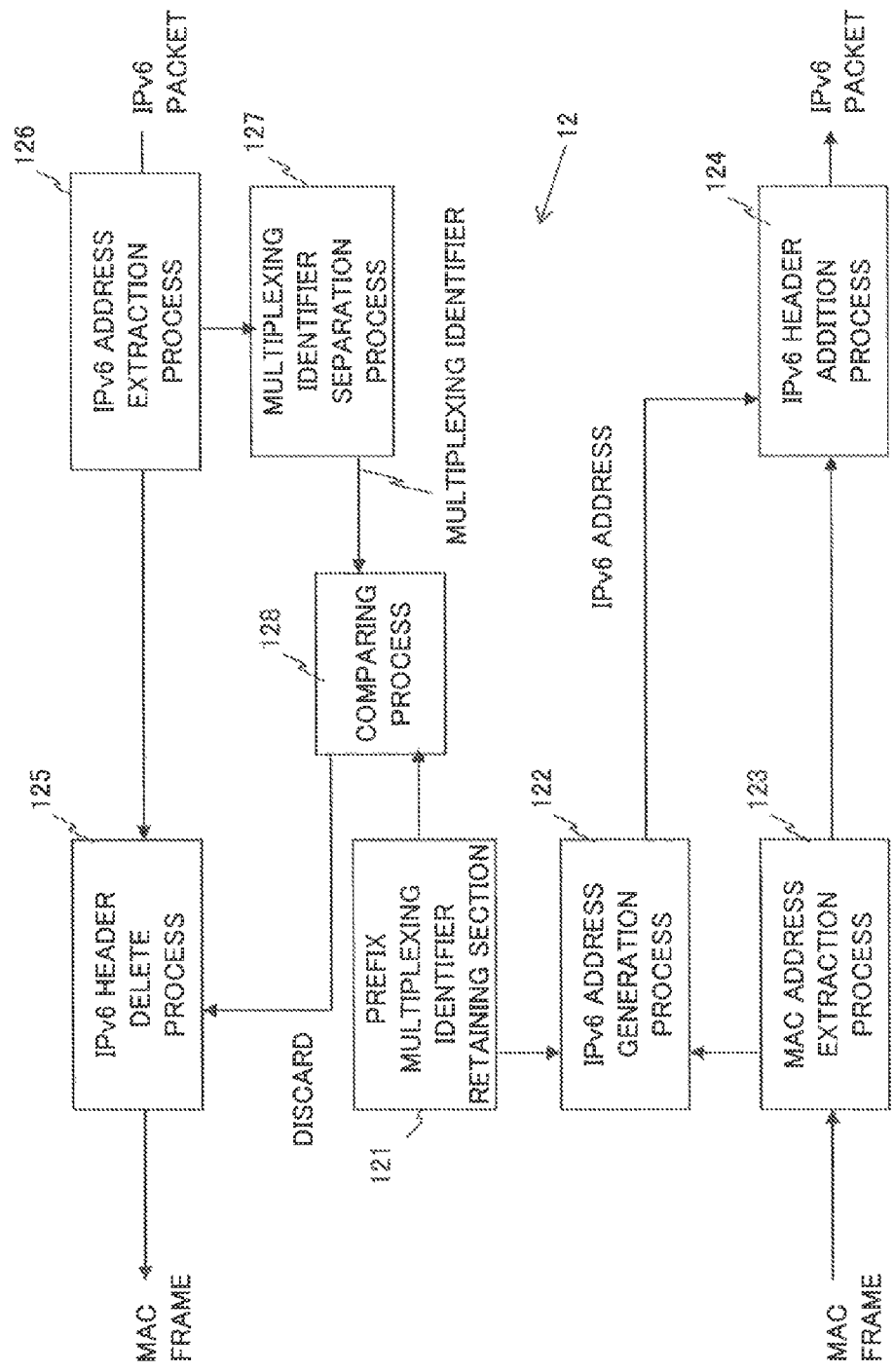

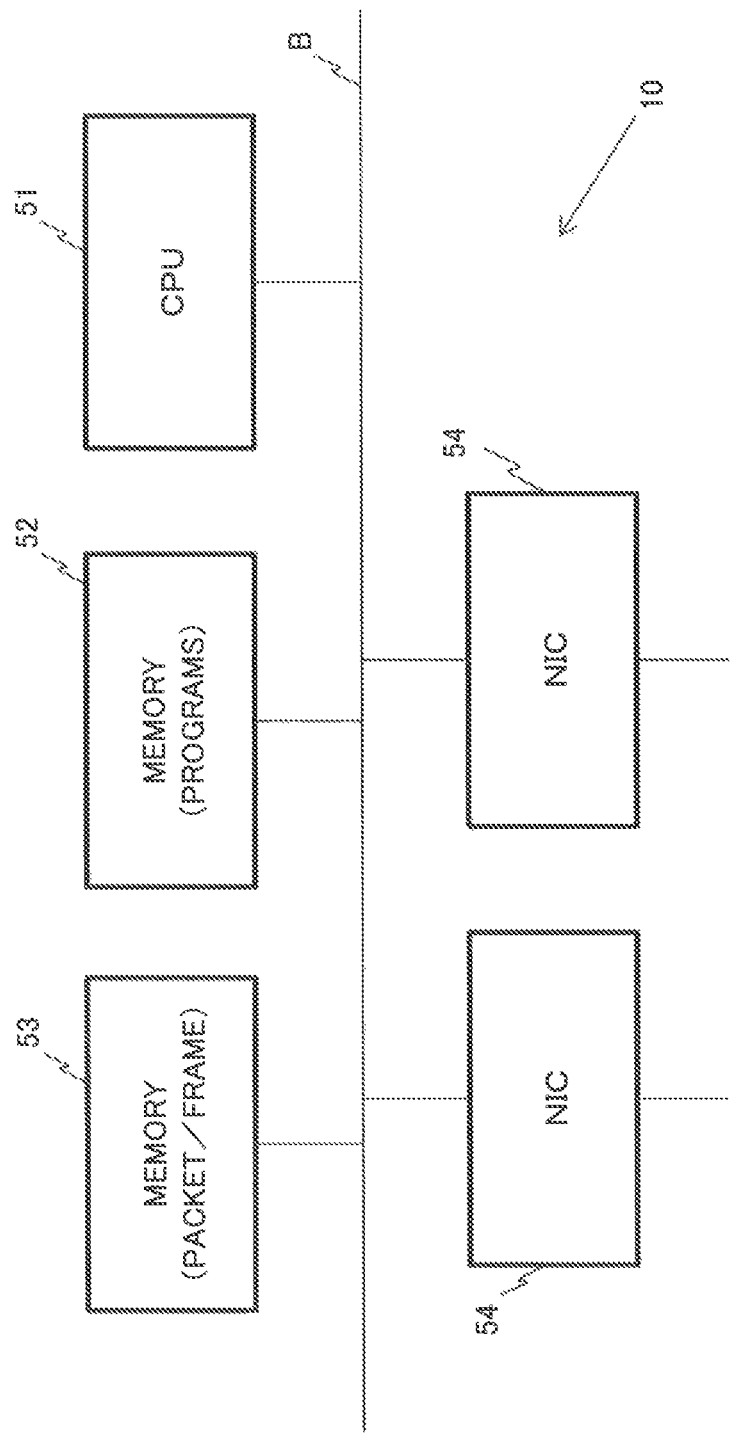

LAN MULTIPLEXING APPARATUS

CROSS-REFERENCE TO RELATED APPLICATION

This application is a continuation application of International Application PCT/JP2012/058176 filed on Mar. 28, 2012 and designated the U.S., the entire contents of which are incorporated herein by reference.

FIELD

Disclosure relates to relates to a LAN multiplexing apparatus.

BACKGROUND

Ethernet (registered trademark) is one of Local Area Network (LAN) Standards. The Ethernet (registered trademark) is the LAN connected by cables and is used for establishing connections between personal computers (PCs), a server and network devices. Recently, the LAN is frequently used for connecting household electrical appliances such as game machines and TV systems to a network.

Further, recently a wireless LAN such as Wi-Fi (registered trademark) is also frequently used for establishing connections between the network and a variety of electronic devices such as mobile phones, smart phones and portable game machines in addition to the PCs and Personal Digital Assistants (PDAs).

Thus, protocols based on the Ethernet (registered trademark) and the wireless LAN is protocols taking charge of a data link layer defined as a second layer (Layer 2) in an Open Systems Interconnection (OSI) reference model.

FIG. 1A is an explanatory diagram of a frame format of the Ethernet (registered trademark), and FIG. 1B is an explanatory diagram an IEEE802.3 frame format. FIG. 1C is an explanatory diagram of an IEEE802.3+802.2(LLC) frame format, and FIG. 1D is an explanatory diagram of an IEEE802.3+802.2(LLC+SNAP) frame format. Thus, the frame format of the Ethernet (registered trademark) and the IEEE802.3 frame format have several variations including the frame formats illustrated in FIGS. 1C and 1D as a result of extensions. It is, however, common among all the frame formats to use Media Access Control (MAC) addresses as a source address and a destination address.

In the present specification, the network of Layer 2 using the frames as depicted in FIGS. 1A-1D will hereinafter be called the "LAN" or a "wired LAN", and each of the frames used in the LAN will hereinafter be called a "MAC frame".

On the other hand, the wireless LAN also has the same frame format as the format of the MAC frame. FIG. 1E is an explanatory diagram of the frame format of IEEE802.11 defined as the LAN Standard for the wireless LAN. The format illustrated in FIG. 1E has four address fields. A value stored in each address field varies depending on a combination of the wired LAN and the wireless LAN in a network configuration (topology). The frame in the wireless LAN will hereinafter be called a "wireless LAN frame".

FIG. 2 is an explanatory diagram of designating the address field of an IEEE802.11 header in a case where a wired section and a wireless section are connected to each other. In FIG. 2, the wireless section is provided between a wireless LAN terminal and an access point (AP), and the AP is connected to the network to form the wired section.

When a frame is transmitted from the wireless section to the wired section (a wireless LAN terminal->an AP), as illustrated in an example of FIG. 2, Basic Service Set Identifier (BSSID) is set in a first address field (Address 1) of the IEEE802.11 header of the frame. The BSSID is one of network identifiers based on IEEE802.11 and corresponds to the MAC address of the AP. The MAC address of the wireless LAN terminal is set as a MAC source address (MAC-SA) in a second address field (Address 2). The MAC address of a destination of the frame is set as a MAC destination address (MAC-DA) in a third address field (Address 3). There is no address to be set in a fourth address field (Address 4).

On the other hand, when a frame is transmitted from the wired section to the wireless section (an AP->a wireless LAN terminal), the "MAC-DA" (the MAC address of the wireless LAN terminal) is set in the first address field of the IEEE802.11 header of the frame, and "BSSID" (the MAC address of the AP) is set in the second address field. The "MAC-SA" is set in a third address field. There is no address to be set in the fourth address field. As illustrated in FIG. 2, in the wireless LAN, the MAC addresses are used as the source address and the destination address.

Incidentally, the Internet is one of networks which is widely used at present. The Internet is a network adopting an Internet Protocol (IP) as a protocol for a third layer (Layer3), i.e., a network layer in the OSI reference model. The IP protocol is classified into IPv4 used from the beginning and IPv6 developed for solving a depletion issue of the IPv4 address.

The Internet is explained as "a network of networks" as the case may be. This implies that "the Layer3 network is a network to interconnect the Layer2 networks". The Layer2 network is different from the Layer3 network.

The IP protocol is originally a protocol developed for the Internet. Recently, however, the IP protocol is diverted to private networks, enterprise networks (Intranets), etc., which are not connected the Internet at a Layer3 (L3) level. Further, such a point is reached that the IP protocol is utilized on in-home networks. In the present specification, the network utilizing the IP protocol is called an "IP network". The wired LAN and the wireless LAN described above are generally used on the IP network represented by the Internet. An IP packet forwarded via the wired LAN is encapsulated with a MAC frame (a frame based on IEEE802.3), while the IP packet forwarded via the wireless LAN is encapsulated with a wireless LAN frame (a frame based on IEEE802.11).

An extended technology called Virtual LAN (VLAN: IEEE802.1Q) is exemplified as a technology related to the LAN. The VLAN is used for forming logical networks on a physical network(s). For example, the VLAN is used in the case of segmenting a physically shared network on a predetermined management unit and managing the segmented networks per management unit. Alternatively, the VLAN is used to multiplex (accommodate) a plurality of IP networks employing IPv4 private addresses on the same physical network.

FIG. 3A is an explanatory diagram of a format of an IEEE802.1Q frame. The format of the IEEE802.1Q frame is formed by adding a VLAN Tag field (TAG: 32 bits) to an Ethernet (registered trademark) frame. It is feasible to distinguish among 4,094 VLANs at the maximum by use of a VLAN Identifier field (VID: 12 bits) in the VLAN Tag field.

Classically, the VLAN was used for segmenting the LAN into a plurality of management units to operate the LAN at the management unit. Thereafter, the VLAN is used for providing wide-area LAN services for establishing connections between the LANs each of which is in a plurality of base points. Main users of the wide-area LAN services are enterprises having a plurality of base points and an intra-network, and generally private addresses are employed in the intra-network. Therefore, the VLAN (VID) being different per intra-network is allocated even in an environment where the same IP address is utilized for the different enterprises, thereby enabling intra-networks to be logically distinguished from each other.

Recently, the VLAN is increasingly utilized to build up infrastructures for data centers and cloud services. Especially, when hosting relating to user networks (e.g., enterprise systems) is performed, the same address is used within the different enterprises similarly to the wide-area LAN services as the case may be. In this case, there is a merit that a network can be logically segmented (divided) by the VLAN technology (the users (networks) are identified by VIDs).

For more information, see International Publication Pamphlet No. WO2001/099354

SUMMARY

One of aspects of embodiments is a LAN multiplexing apparatus connected to at least any one of a LAN and a wireless LAN and connected to a packet network. The LAN multiplexing apparatus includes:

at least one network interface to be connected to at least any one of the LAN and the wireless LAN and connected to the packet network; and a control device to perform a process to encapsulate a MAC frame received from at least any one of the LAN and the wireless LAN with a packet header including a packet network address containing at least a multiplexing identifier and a MAC address and to send the encapsulated packet to the packet network, and a process to send a MAC frame obtained by decapsulating a packet received from the packet network to at least any one of the LAN and the wireless LAN corresponding to a destination of the MAC frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is an explanatory diagram of a frame format of Ethernet (registered trademark);

FIG. 1B is an explanatory diagram of a frame format of IEEE802.3;

FIG. 2 is an explanatory diagram of specifying an address field of an IEEE802.11 header in the case of a cable-wireless connection;

FIG. 3A is an explanatory diagram of a frame format of IEEE802.1Q;

FIG. 3B is an explanatory diagram of a frame format in the case of applying double tagging to the IEEE802.1Q;

FIG. 5A illustrates an example of applying an IPv6 header as the packet header to the format depicted in FIG. 4A;

FIG. 5B illustrates an example of applying the IPv6 header as the packet header to the format depicted in FIG. 4B;

FIG. 9 is a diagram schematically illustrating a process to control an encapsulation function depicted in FIG. 8;

FIG. 10 illustrates another mode of the encapsulation function of a CPU; and

FIG. 11 illustrates an example of a hardware configuration of the LAN multiplexing apparatus.

DESCRIPTION OF EMBODIMENTS

Figure 1C:
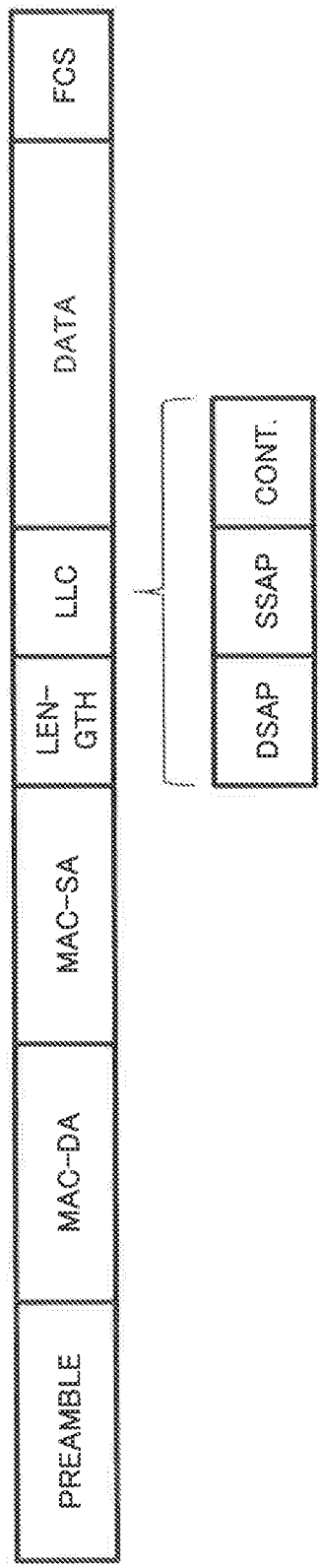
FIG. 1C is an explanatory diagram of a frame format of IEEE802.3+802.2(LCC)
Figure 1D:
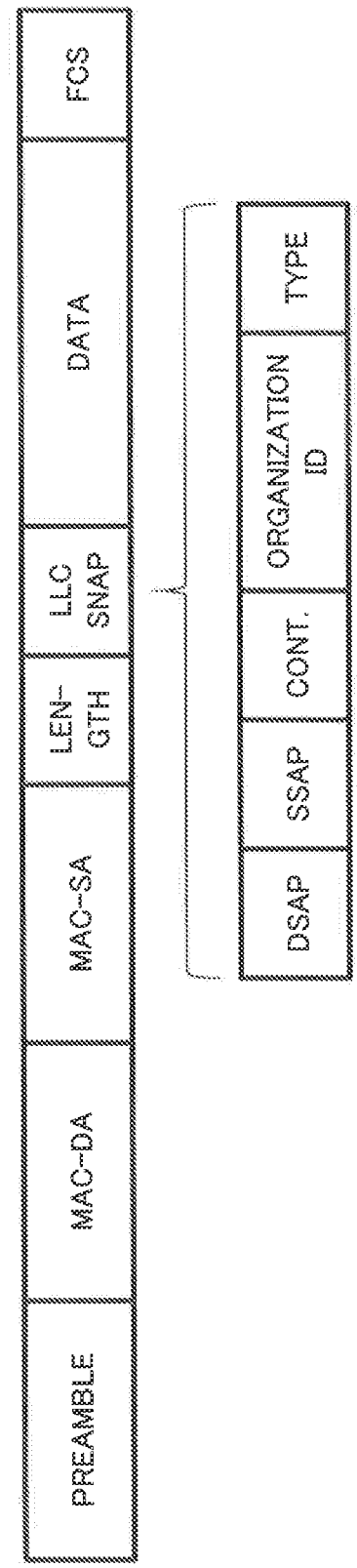
FIG. 1D is an explanatory diagram of a frame format of IEEE802.3+802.2(LCC+SNAP)
Figure 1E:
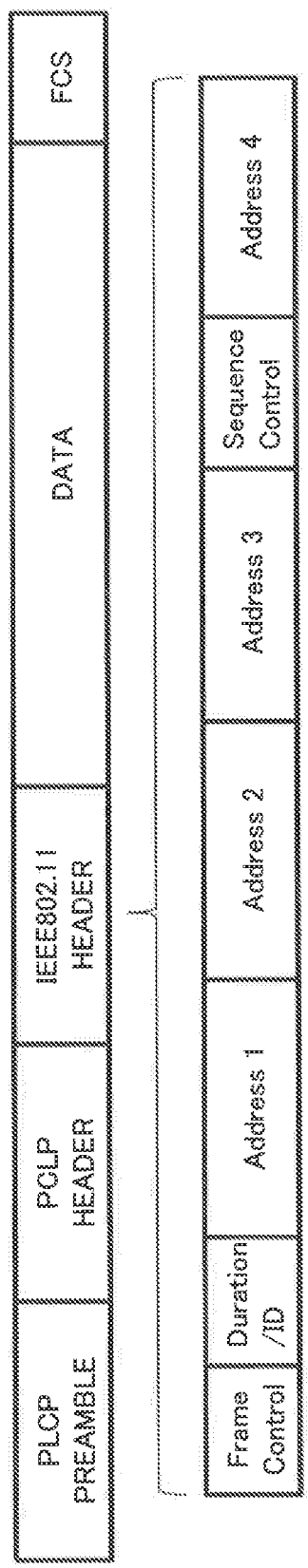
FIG. 1E is an explanatory diagram of a frame format of IEEE802.11.

The prior art described above has, however, the following problems. To be specific, the VID in the IEEE802.1Q format is 12 bits. Hence, supposing that one VID is allocated to one user (e.g., the enterprise), a maximum number of users becomes 4,096. If two VIDs are allocated to one user, the maximum number of users becomes 2,048, and, if three VIDs are allocated to one user, the maximum number of users becomes 1,365. Thus, as the number of the VIDs allocated to one user increases, the maximum number of users decreases. It was hard to say that the numeral "4,096" is sufficient for actualizing a large-scale data center.

On the other hand, there are technologies called "double tagging" and "triple tagging". The double tagging is defined at IEEE802.1ad and is also a technology called "Q in Q". FIG. 3B illustrates a frame format in the case of applying the double tagging to the IEEE802.1Q frame format. As illustrated in FIG. 3B, the format has two VLAN Tag fields (TAGs), in which different VIDs can be set in the respective TAGs. In the "triple tagging", three VLAN Tag fields are provided in the frame format. According to the double tagging technology, the number of VIDs is given by 4,096× 4,096≈16,770,000. Further, if using the triple tagging technology, the number of VIDs is about six hundred billions by 4,096×4,096×4,096.

However, the multiple tagging technologies such as the double tagging and triple tagging technologies have the following problems.

(1) Originally, 802.3 LAN such as Ethernet (registered trademark) is assumed to be utilized as a small-scale local area network. Therefore, such LAN has a preparation of neither means for managing nor means for troubleshooting. Consequently, a large-scale configuration for an operational management is hard to attain.

(2) 802.3 LAN involves using broadcasting frequently, and hence, if a loop of topology is formed, such a problem arises that a broadcast storm occurs. 802.3 LAN cannot therefore enlarge a network scale. Assuming that the network scale is enlarged by applying the multiple tagging technology, there is a possibility that a trouble such as the broadcast storm spreads on a large scale but cannot be localized.

(3) Propagation of a broadcast traffic may result in increment of an occupation ratio of futile traffic augments with an increase in network scale.

(4) Due to hierarchization of the networks, the operational management about other hierarchies has to be hierarchized, and such an operational problem occurs that a different hierarchy cannot be examined from a certain hierarchy.

(5) A data length (payload length) decreases due to the tagging, however, learning thereof cannot be performed.

(6) The tagging cannot be conducted with respect to the wireless LAN, and a restriction occurs in an environment where the wired LAN and the wireless LAN are intermixed.

(7) Pieces of equipment building up the network are requested to support the IEEE802.1Q and the multiple tagging technology respectively, and therefore a cost required for building up the network rises, resulting in an economical difficulty to actualize the network.

An object of one of aspects of embodiments is to provide a technology capable of multiplexing at least any one of LANs and wireless LANs on a packet network at high efficiency.

Embodiments of the present invention will hereinafter be described with reference to the drawings. Configurations of the following embodiment are an exemplification, and the present invention is not limited to the configurations of the embodiment.

<Frame Format>

Figure 4A:
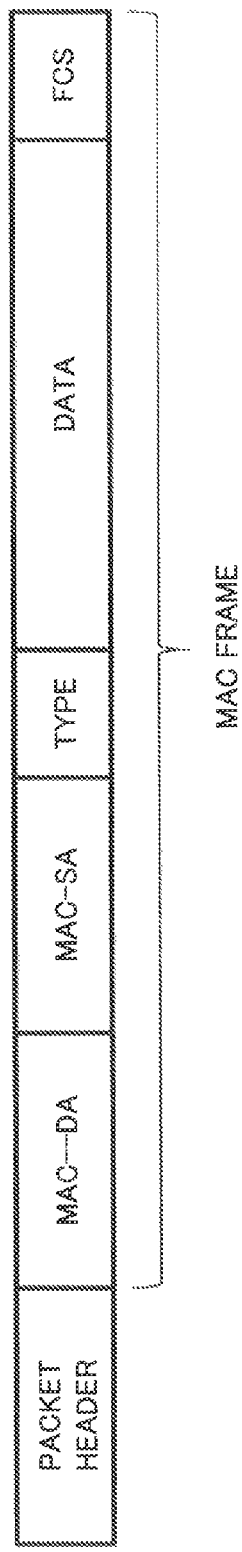
FIG. 4A is an explanatory diagram of encapsulation of a MAC frame.
Figure 4B:
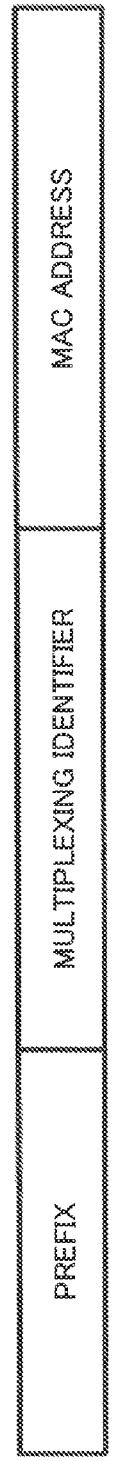
FIG. 4B is a diagram illustrating a format of an address field in a packet header used for the encapsulation.

At first, a frame format applied to a LAN multiplexing apparatus according to the embodiment of the present invention will be described. FIG. 4A is an explanatory diagram of encapsulation of a MAC frame, and FIG. 4B is a diagram illustrating a format of an address field in a packet header used at encapsulation. As illustrated in FIG. 4A, the MAC frame is encapsulated by giving a packet header.

The MAC frame is exemplified as an Ethernet (registered trademark) frame and an IEEE802.3 frame (including an extended frame) as depicted in FIGS. 1A-1D. FIG. 4A illustrates the Ethernet (registered trademark) frame. The address field of the packet contains, as illustrated in FIG. 4B, a prefix field, a multiplexing identifier field and a MAC address field. The multiplexing identifier field and the MAC address field may be sequenced differently. Further, the packet header can adopt a structure further containing a field to be stored with a different item of information from those in the multiplexing identifier field and in the MAC address field.

A prefix set in the prefix field is high-order information in an address space and has a predetermined value. A multiplexing identifier set in the multiplexing identifier field is an identifier for identifying a logical space (a plurality of logical networks configured on a physical network), and corresponds to "VID" in VLAN (VLAN-ID) (Virtual Identifier in Virtual LAN).

For example, the same value as a value (e.g., MAC-DA) of the MAC address of the MAC frame to be encapsulated is set in the MAC address field. The value of the MAC address can be generated by copying the MAC address (MAC) of the MAC frame on the occasion of the encapsulation.

FIGS. 5A and 5B depict examples in which an IPv6 header is applied as a packet header to the format illustrated in FIGS. 4A and 4B. A bit length of the IPv6 header is 128 bits, and a bit length of the MAC address field is 48 bits. In this case, a bit length of the prefix becomes (128-n-48) bits.

Note that a configuration of copying not only the MAC-DA but also the MAC-SA to the MAC address field in the address field of the packet header may be adopted. In this case, the MAC-DA is copied to the MAC address field for the MAC-DA in the packet header, and the MAC-SA is copied to the MAC address field for the MAC-SA in the packet header. Then, when the packet header is based on IPv6, the bit length of the MAC address field becomes 96 (48*2) bits, and the bit length of the prefix becomes (32-n) bits.

<Example of Configuration of Network System>

Figure 6:
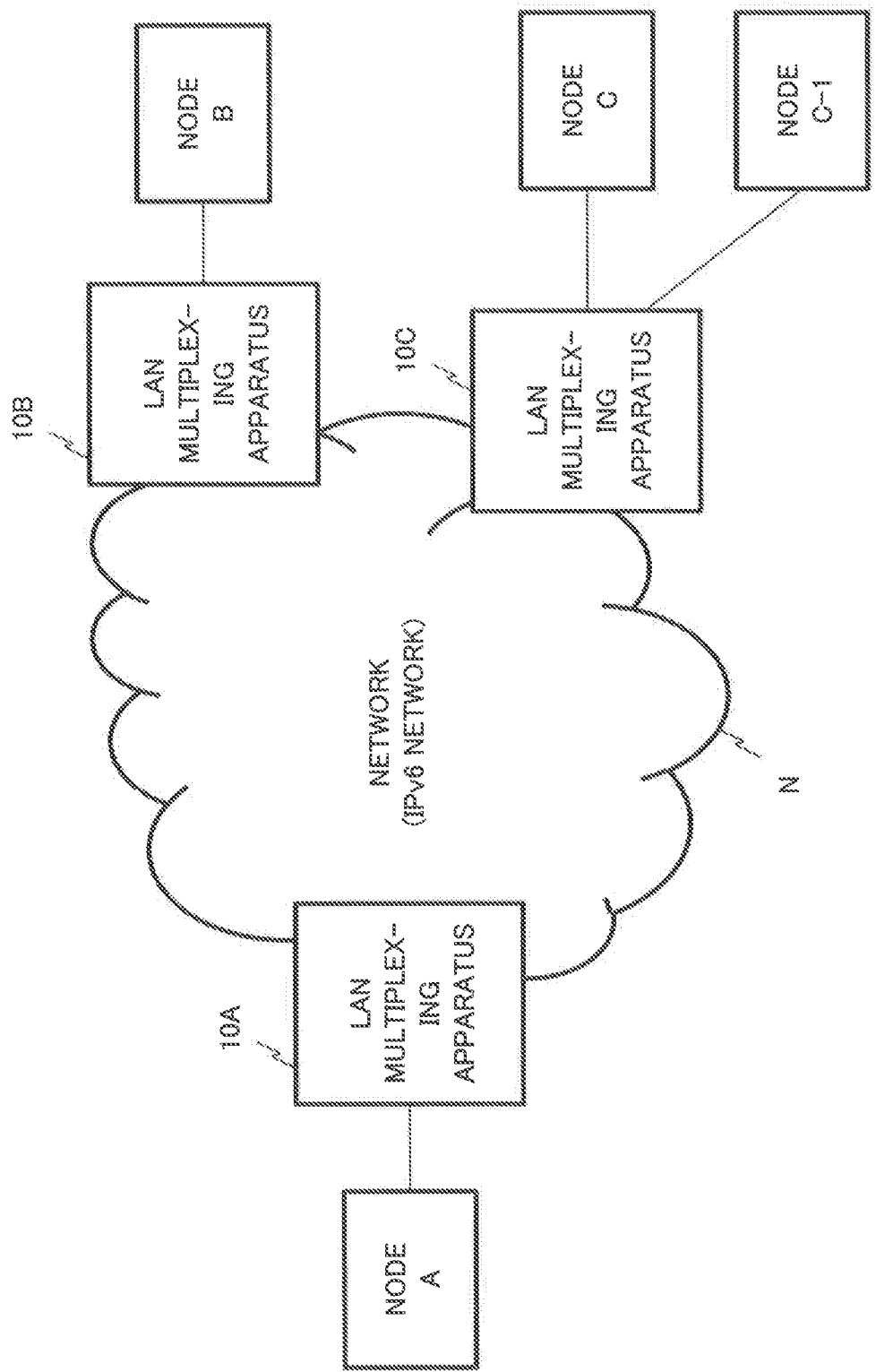
FIG. 6 illustrates an example of configuration of a network system using a LAN multiplexing apparatus to which the IPv6 packet is applied.

FIG. 6 illustrates an example of configuration of a network system using the LAN multiplexing apparatus to which the IPv6 packet described above is applied. The example illustrated in FIG. 6 will discuss a case of the multiplexing identifier being the same. In FIG. 6, a LAN multiplexing apparatus 10 establishes a connection between a packet network N and a node. The example illustrated in FIG. 6 exemplifies the LAN multiplexing apparatus 10 (10A) connected to a node A via a communication line, the LAN multiplexing apparatus 10 (10B) connected to a node B via another communication line, and the LAN multiplexing apparatus 10 (10C) connected to a plurality of nodes including a node C and a node C1 via other communication lines. The number of the LAN multiplexing apparatuses 10 connected to the packet network can be properly set.

The packet network N is an IPv6 network. The LAN multiplexing apparatuses 10A, 10B, 10C are interconnected via the packet network N. The nodes are, for example, a host device (terminal device) and replay devices (routers or switches). Further, the LAN multiplexing apparatus 10 can connect with a single or a plurality of nodes. The node A has a MAC address "MAC-A", the node B has a MAC address "MAC-B", the node C has a MAC address "MAC-C", and the node C1 has a MAC address "MAC-C1".

Each of the LAN multiplexing apparatuses 10A, 10B, 10C announces the addresses associated with the nodes connected as subordinates under the LAN multiplexing apparatus itself to the packet network N. Any one of, for example, RIP (Routing Information Protocol), OSPF (Open Shortest Path First), IS-IS (Intermediate System-Intermediate System) and BGP (Border Gateway Protocol), which support the IPv6, can be applied as a route switching protocol (routing protocol) for the announcement. As a matter of course, the addresses may also be set in the respective LAN multiplexing apparatuses 10 by static setting.

When the IPv6 is used as the packet protocol, the LAN multiplexing apparatus 10A, to which the node A is connected, announces an IPv6 address of "prefix+multiplexing identifier+MAC-A" as a route. Similarly, the LAN multiplexing apparatus 10B, to which the node B is connected, announces an IPv6 address of "prefix+multiplexing identifier+MAC-B". The LAN multiplexing apparatus 10C, to which the node C and the node C1 are connected, announces IPv6 addresses associated with the respective nodes as routes, these IPv6 addresses containing at least an IPv6 address of "prefix+multiplexing identifier+MAC-C" and an IPv6 address of "prefix+multiplexing identifier+MAC-C1".

The LAN multiplexing apparatuses 10A, 10B, 10C store the announced IPv6 addresses and information of ports receiving these addresses in the way of being associated with each other, thereby route information employed for a packet transfer process (relay process) is stored.

In the network system illustrated in FIG. 6, an operation in a communication from the node A to the node B will be described. The node A generates the MAC frame containing data in order to transmit the data to the node B. A MAC destination address (MAC-DA) of the MAC frame is the MAC address "MAC-B" of the node B, and a MAC source address (MAC-SA) is the MAC address "MAC-A" of the node A.

The MAC frame transmitted from the node A reaches the LAN multiplexing apparatus 10A. The LAN multiplexing apparatus 10A generates an IPv6 destination address (IP-DA) and an IPv6 source address (IP-SA) associated with the received MAC frame (MAC-DA), and encapsulates the MAC frame with an IPv6 packet containing these IP addresses. At this time, the address "prefix+multiplexing identifier+MAC-B" announced from the LAN multiplexing apparatus 10B is set as the IP-DA according to the value (MAC-B) of the MAC-DA of the MAC frame. As for the IP-SA, the address "prefix+multiplexing identifier+MAC-A" associated with the MAC-SA (MAC-A) can be set as the IPv6 source address IP-SA. The LAN multiplexing apparatus 10A sends the encapsulated MAC frame (IPv6 packet) to the packet network N.

In the packet network N, the IPv6 packet is forwarded based on an IP routing mechanism (in accordance with the IP-DA "prefix+multiplexing identifier+MAC-B") to the LAN multiplexing apparatus 10B to which the node B is connected.

The LAN multiplexing apparatus 10B receiving the IPv6 packet extracts the original mac extracts the original MAC frame from the IPv6 packet by decapsulating the IPv6 packet, and sends the MAC frame to the node B. This operation being thus done, the MAC frame (data) coming from the node A reaches the destination node B. In the case of transmitting the data to the node A from the node B, operations reversed to the operations described above are executed.

Figure 7:
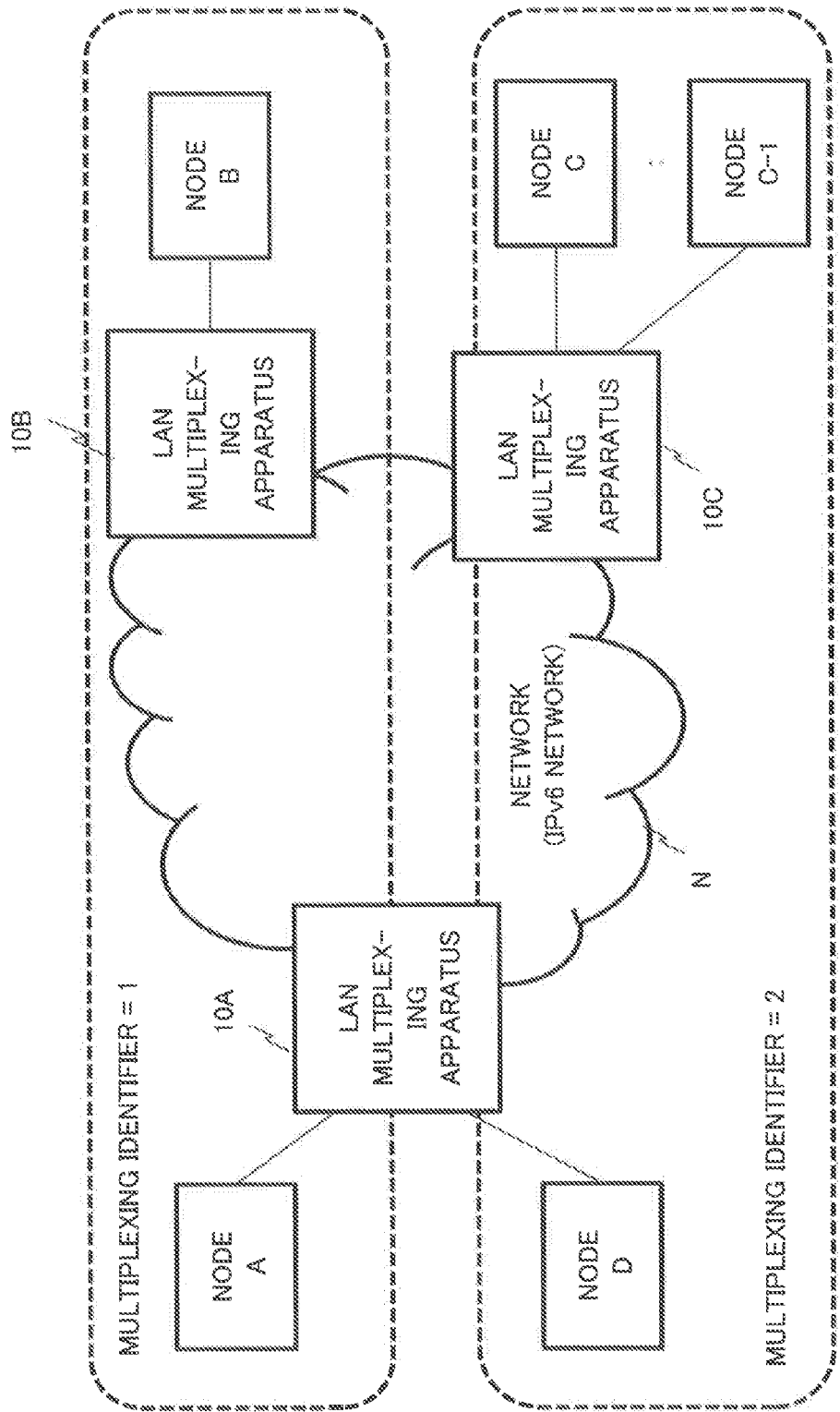
FIG. 7 is an explanatory diagram of an operation in the case of using different multiplexing identifiers in the network system illustrated in FIG. 6.

FIG. 7 is an explanatory diagram of an operation in the case of using different multiplexing identifiers in the network system depicted in FIG. 6. FIG. 7 illustrates two areas circumscribed by broken lines, in which each area configures one logical network. To be specific, the node A and the node B belong to the logical network identified by a multiplexing identifier "1", while a node D, the node C and the node C1 belong to a logical network identified by a multiplexing identifier "2".

The multiplexing identifier is set basically for a network interface possessed by the LAN multiplexing apparatus 10. Namely, the logical network to which the node connected to the network interface belongs is specified by setting the multiplexing identifier. Rationally, the logical network to which the node belongs can be also specified not on an interface basis but on a device basis.

In the example illustrated in FIG. 7, the node A is expressed by an address "prefix+multiplexing identifier (=1)+MAC-A" in the IPv6 address space. The node B is expressed by an address "prefix+multiplexing identifier (=1)+MAC-B" in the IPv6 address space. On the other hand, the node C is expressed by an address "prefix+multiplexing identifier (=2)+MAC-C". The node C1 is expressed by an address "prefix+multiplexing identifier (=2)+MAC-C1". Then, the node D is expressed by an address "prefix+multiplexing identifier (=2)+MAC-D". These addresses can be set in each LAN multiplexing apparatus 10 by the same technique as described with reference to FIG. 6.

Data transmission between the node A and the node B and a data communication between two points among the node D, the node C and the node C1, are performed by the same operation as the transfer operation explained in FIG. 6. At this time, the packet is transferred via the same network N (the IPv6 network) irrespectively of a difference between the multiplexing identifiers. Namely, the single IPv6 network can be employed even when the multiplexing identifiers are different from each other. Thus, a plurality of logical LANs can be configured on the IPv6 network. In other words, the plurality of logical LANs can be configured on one physical network.

The number of the logical networks, which can be configured on the network N, depends on a bit count n allocated to the multiplexing identifier. For example, in the case of the IPv6 being applied, when the multiplexing identifier is 16 bits (n=16), a maximum number of the logical networks, which can be allocated, becomes "65536", and a prefix length becomes 64 bits. Further, when the multiplexing identifier is 32 bits (n=32), the maximum number of the logical networks, which can be allocated, becomes approximately "forty three hundred million", and the prefix length becomes 48 bits. It can be considered that the numeral "forty three hundred millions" implies a limitless number of the logical networks which can be configured in fact.

<Example of Configuration of LAN Multiplexing Apparatus>

Figure 8:
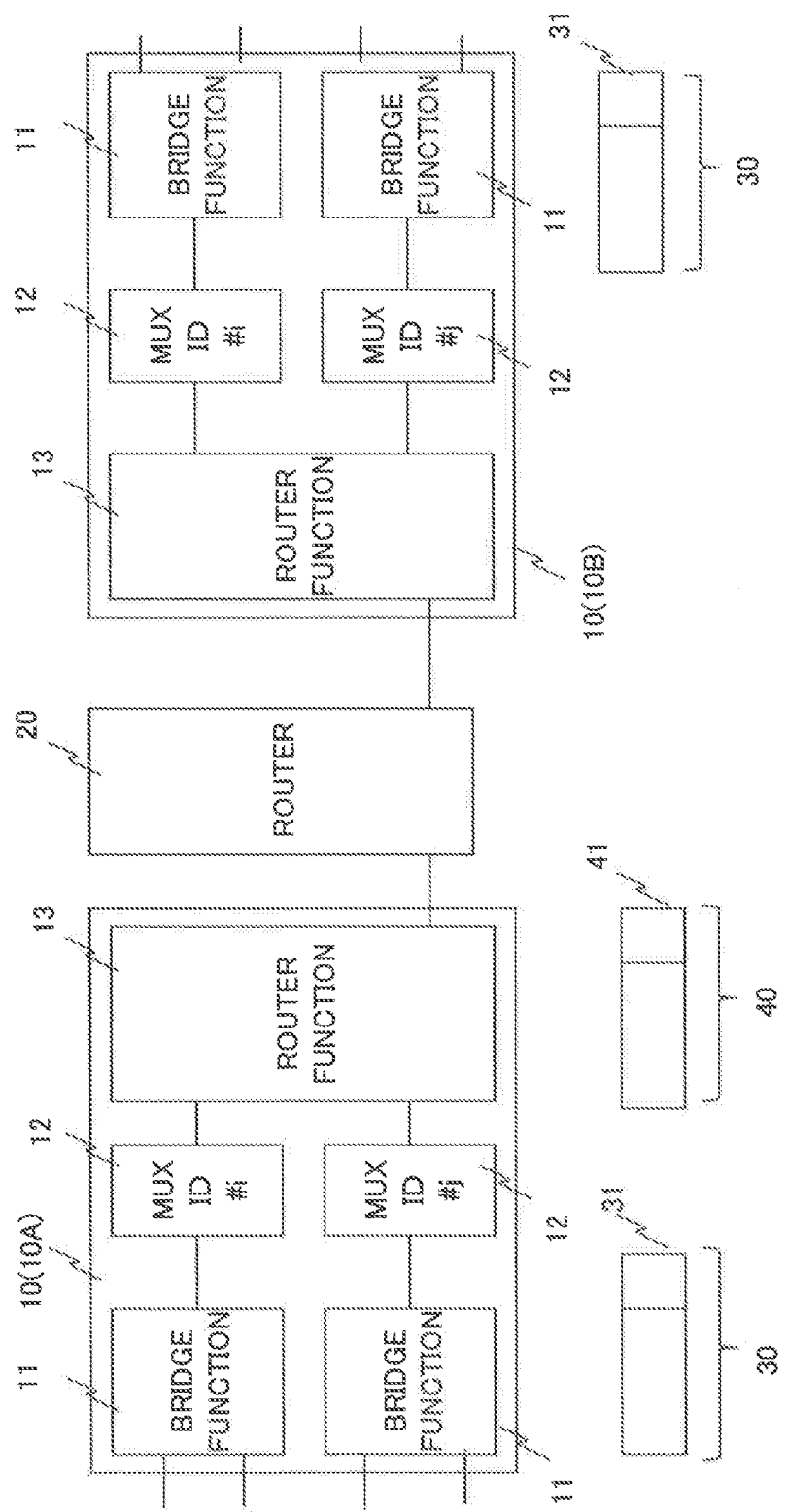
FIG. 8 is a diagram schematically illustrating functions possessed by the LAN multiplexing apparatus illustrated in FIGS. 6 and 7.

FIG. 8 is a diagram schematically illustrating functions possessed by the LAN multiplexing apparatus 10 depicted in FIGS. 6 and 7 in conjunction with network configuration. The LAN multiplexing apparatus 10 includes one or more bridge functions 11 to accommodate the LAN, and a router function 13 connected to the packet network (e.g., the IPv6). The bridge function 11 is connected to the router function 13 via an encapsulation function 12 provided for, e.g., every bridge function (LAN interface).

The encapsulation function 12 generates the IPv6 packet encapsulated with the MAC frame. The encapsulation function 12 retains (stores) the multiplexing identifier (multiplexing ID). The multiplexing identifier is used for generating the IPv6 address (IP-DA, IP-SA) on the occasion of the encapsulation.

The bridge function 11 refers to the MAC addresses (MAC-DA, MAC-SA) in the MAC frame received from the LAN, and transmits the MAC frame to the encapsulation function 12 according to the necessity (e.g., when it can be determined that the MAC destination address MC-DA and the MAC source address MAC-SA belong to the different LANs). Further, the bridge function 11 outputs the MAC frame received from the encapsulation function 12 to the LAN corresponding to the MAC-DA. The bridge function 11 may be not only the bridge function corresponding to the LAN but also a bridge function corresponding to the wireless LAN. The bridge function corresponding to the wireless LAN converts the frames between the wireless section and the wired section (the wireless LAN frame (IEEE802.11 frame) <---> the MAC frame (Ethernet (registered trademark) frame, etc.).

The router function 13 has a routing table in which the IP-DAs are associated with output ports, and sends the IP packet from the port associated with the IP-DA of the IP packet (the IPv6 packet) received from a router 20 or the multiplexing function 12.

FIG. 9 schematically illustrates a process to control the encapsulation function 12 illustrated in FIG. 8. The encapsulation function 12 includes a retaining section 121 to retain the prefix and the multiplexing identifier, an IPv6 address generation process 122, a MAC address extraction process 123, an IPv6 header addition process 124 and an IPv6 header delete process 125.

The retaining section 121 associates the prefix and the multiplexing identifier with the MAC address and stores (retains) them. The prefix and the multiplexing identifier stored in the retaining section 121 may be stored statically and may also be stored with the announced IPv6 address.

The MAC address extraction process 123 extracts the MAC address (MAC-DA, MAC-SA) from the MAC frame inputted from the bridge function 11. The IPv6 address generation process 122 acquires, from the retaining section 121, the prefix and the multiplexing identifier each associated with the MAC address extracted by the MAC address extraction process 123 Subsequently, the IPv6 address (IP-DA, IP-SA) is generated from the acquired prefix and multiplexing identifier and from the MAC address (MAC-DA, MAC-SA) described above.

The IPv6 header addition process 124 generates an IPv6 header containing the IPv6 address (IP-DA, IP-SA) generated by the IPv6 address generation process 122, and adds the generated IPv6 header to the MAC frame, thereby generating the IPv6 packet. The thus generated IPv6 packet is inputted to the router function 13.

On the other hand, the IPv6 packet output from the router function 13, with its IPv6 header being deleted by the IPv6 header delete process 125, is thus decapsulated, with the result that the MAC frame is output.

FIG. 10 depicts another mode of the encapsulation function 12. In the mode illustrated in FIG. 10, the encapsulation function 12 executes, in addition to the retaining section 121 and the respective processes 122-125 illustrated in FIG. 9, an IPv6 address extraction process 126, a multiplexing identifier separation process 127 and a comparing process 128. Namely, the IPv6 address extraction process 126 extracts the IPv6 address (IP-DA) out of the IPv6 packet given from the router function 13.

The multiplexing identifier separation process 127 separates the multiplexing identifier from the IP-DA. The comparing process 128 compares the separated multiplexing identifier with the multiplexing identifiers stored in the retaining section 121. As a result of the comparison, if the separated multiplexing identifier is not coincident with any multiplexing identifiers stored in the retaining section, a discard instruction is handed over to the IPv6 header delete process 125. The IPv6 header delete process 125 discards the IPv6 packet corresponding to the discard instruction. Whereas if the separated multiplexing identifier is coincident with any one of the multiplexing identifiers stored in the retaining section, the IPv6 header delete process 125 executes a normal decapsulating process for the relevant IPv6 packet. Through these processes, the IPv6 packet reached due to erroneous transmission can be discarded.

FIG. 11 illustrates an example of a hardware configuration of the LAN multiplexing apparatus 10 capable of realizing the functions and the processes illustrated in FIGS. 8 to 10. In FIG. 11, the LAN multiplexing apparatus 10 includes a CPU 51, a memory (storage device: storage) 52, a memory (storage device: storage) 53 and a plurality of network interface cards (NIC) 54, which are interconnected via a bus B.

The NIC 54 is one example of a communication interface and is connected to the LAN and to the packet network (IP network) via the communication lines. The NIC 54 connected to the LAN is equipped with electric/electronic circuits for realizing the bridge function 11 illustrated in FIG. 8, and transmits and receives the made to transition to frame. When the LAN multiplexing apparatus 10 performs wireless communications with the wireless LAN terminal, there is provided the NIC 54 for the wireless LAN, the NIC 54 serving to transmit and receive wireless LAN frames. The NIC 54 connected to the IP network is equipped with the electric/electronic circuits for realizing the router function 13 illustrated in FIG. 8 and with a memory.

The memory 52 includes a nonvolatile area (e.g., a ROM (Read Only Memory), a flash memory, an EEPROM (Electrically Erasable Programmable Read-Only Memory) stored with a program executed by the CPU 51 and data used when executing the program, and a volatile area (e.g., a RAM (Random Access Memory) used as an operation area for the CPU 51.

The memory 53 is used as the operation area to carry out processes for the IP packet and the MAC frame such as generating the packet and the frame, extracting the address, adding the header and deleting the header, or alternatively as a buffer area to temporarily accumulate the IP packets and the MAC frames. The CPU 51 is one example of a processor (microprocessor) and executes the program stored in the memory 52, thereby accomplishing the encapsulation function 12 depicted in FIG. 8 and executing the variety of processes illustrated in FIGS. 9 and 10. The processor includes a DSP (Digital Signal Processor). The retaining section 121 illustrated in FIGS. 9 and 10 is configured in, e.g., the nonvolatile area of the memory 52.

The following are processes of the LAN multiplexing apparatuses 10A and 10B when the node A depicted in FIGS. 6 and 7 transmits the data to (performs the communication with) the node B via the LAN multiplexing apparatuses 10A and 10B The MAC frame transmitted from the node A reaches the LAN multiplexing apparatus 10. Namely, a MAC frame 30 (FIG. 8) having the MAC header 31 is received by the NIC 54 connected to the node A and stored in the memory 53. Thereupon, the CPU 51 functions as the encapsulation function 12, thereby executing the MAC address extraction process 123, the IPv6 address generation process 122 and the IPv6 header addition process (124) and generating an IPv6 packet 40 (FIG. 8) having an IP header 41 addressed to the node B on the memory 53. The IPv6 packet 40 is transferred to the NIC 54 connected to the packet network (IPv6 network) and then forwarded to the IPv6 network.

A router 20 within the IPv6 network forwards the IPv6 packet 40 to the LAN multiplexing apparatus 10B in accordance with the IP-DA of the IPv6 packet 40. In the LAN multiplexing apparatus 10B, the IPv6 packet 40 is received by the NIC 54 connected to the IPv6 network and stored in the memory 53. The CPU 51 of the LAN multiplexing apparatus 10B, when functioning as the encapsulation function 12 illustrated in FIG. 9, executes the IPv6 header delete process 125, thereby obtaining a MAC frame 30 from the IPv6 packet 40. Thereafter, the MAC frame 30 is transmitted to the node B via the NIC 54 connected to the node B.

The CPU 51 of the LAN multiplexing apparatus 10B, whereas when functioning as the encapsulation function 12 illustrated in FIG. 9, executes the IPv6 address extraction process 126, the multiplexing identifier separation process 127 and the comparing process 128, and executes the IPv6 header delete process 125 on the condition that the multiplexing identifier in the IP header 41 is coincident with the multiplexing identifier retain by the retaining section 121.

The CPU 51 of the LAN multiplexing apparatus 10B does not execute the processes 126-128 described above, however, the CPU 51 of the LAN multiplexing apparatus 10 receiving the IPv6 packet addressed to the node A from the node B may be configured to execute the processes 126-128.

Note that the embodiment described above has discussed the case in which the CPU 51 is applied by way of one example of a control device. The processes 121-128 executed by the CPU 51 may also be configured to be realized by dedicated or general-purpose hardware (e.g., an IC, an LSI an ASIC (Application Specific Integrated Circuit), a PLD (Programmable Logic Device: e.g., an FPGA (Field Programmable Gate Array)) and by the control device built up by a combination of these pieces of hardware.

<Operation and Effect of the Embodiment>

As described above, the LAN multiplexing apparatus 10 according to the embodiment and the network system, to which the LAN multiplexing apparatus 10 is applied, can acquire the following effects and advantages.

(1) It is feasible to utilize a management technique such as "ping" being normally used in the IP network and also a troubleshooting technique, and further to facilitate a large-scale configuration for an operational management.

(2) Even when there is a loop of topology in the IPv6 network, the route is selected based on the IP routing protocol, and hence occurrence of a broadcast storm is inhibited.

(3) Hierarchization is not done, and therefore no such problem as to accompany the hierarchization exists in terms of the operational management.

(4) Because of mapping to the IP network without tagging, learning of a packet length can be attained by Path MTU (Maximum Transmission Unit) Discovery, or a flexible response such as a response based on fragmentation is enabled.

(5) The wired LAN and the wireless LAN can be intermixed.

(6) The apparatus supporting IEEE802.1Q or double tagging and triple tagging has no necessity for preparing any network equipment. In a backbone network, the IP equipment such as the normal router and the L3 switch can be utilized, and hence an economical configuration with an introduction cost being restrained can be attained.

Further effects are given as follows.

<1> Generally, the IP network can be configured more broadly on a larger scale and can be therefore deployed in a much wider area.

<2> Multiplexing can be performed with even different types of frames, such as containing an untagged MAC frame with respect to a certain multiplexing identifier and a tagged MAC frame with respect to another multiplexing identifier.

<3> As a matter of course, a large space is given to the multiplexing identifier, and it is therefore possible to multiplex the LAN and the wireless LAN on the packet network substantially limitlessly. It is considered that these effects largely contribute to develop the data network soundly.

Incidentally, it was mentioned that the MAC-DA and the MAC-SA may be stored in the MAC address field of the packet header. In this case, the bit count of the MAC address field becomes 96 bits, and hence such a possibility exists as to decrease the number of values that can be taken by the multiplexing identifier (maximum multiplexing count). As a matter of course, even when the multiplexing count decreases, the effects (1)-(6) described above can be more enjoyed than in the case of applying the tagging technology in the VLAN.

Further, there has been described the example of applying the MAC-DA as the MAC address used to generate the IPv6 address in the embodiment discussed above. According to this configuration, the IPv6 address can be generated by copying the MAC-DA in the MAC frame. Hence, the retaining section 121 (the memory 52) does not necessarily need to store the MAC address. As described above, however, the retaining section 121 (the memory 52) may be stored with the IPv6 address intact as the announced routing information, and the IPv6 address may also be generated by reading the IPv6 address associated with the MAC-DA from the retaining section 121. The MAC address used to generate the IPv6 address may, of course, be an identifier for uniquely identifying the node (the destination of the MAC address) having, e.g., the MAC-DA.

Further, the embodiment has discussed the MAC frame, however, a wireless LAN frame other than the MAC frame can be encapsulated/decapsulated.

It is preferable that the network system according to the embodiment described so far is applied to implementations for broad LAN services and at a data center each becoming the larger scale.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A LAN multiplexing apparatus to be connected to at least any one of a LAN and a wireless LAN and to be connected to a packet network, the LAN multiplexing apparatus comprising:
    at least one network interface to be connected to at least any one of the LAN and the wireless LAN and connected to the packet network; and
    a control device to perform a process to encapsulate a MAC frame received from at least any one of the LAN and the wireless LAN with a packet header including a packet network address containing at least a multiplexing identifier and a MAC address and to send the encapsulated packet to the packet network, and a process to send a MAC frame obtained by decapsulating a packet received from the packet network to at least any one of the LAN and the wireless LAN corresponding to a destination of the MAC frame.

2. The LAN multiplexing apparatus according to claim 1, wherein:
    the packet is an IPv6 packet; and
    the packet network is an IPv6 network.

3. The LAN multiplexing apparatus according to claim 1, wherein:
    the MAC address is a MAC destination address of the MAC frame;
    the LAN multiplexing apparatus further comprises a storage device stored with a multiplexing identifier corresponding to the MAC address.

4. The LAN multiplexing apparatus according to claim 1, wherein the packet network address includes a prefix, a multiplexing identifier and a MAC address.

5. A network system, comprising:
    a plurality of LAN multiplexing apparatuses connected to at least any one of a LAN and a wireless LAN and connected to a packet network,
    each of the plurality of LAN multiplexing apparatuses, including:
        at least one network interface to be connected to at least any one of the LAN and the wireless LAN and connected to the packet network; and
        a control device to perform a process to encapsulate a MAC frame received from at least any one of the LAN and the wireless LAN by a packet header including a packet network address containing at least a multiplexing identifier and a MAC address and to send the encapsulated packet to the packet network, and a process to send a MAC frame obtained by decapsulating a packet received from the packet network to at least any one of the LAN and the wireless LAN corresponding to a destination of the MAC frame.

6. A method of transferring a MAC frame between LANs using a LAN multiplexing apparatus including at least one network interface to be connected to at least any one of the LAN and the wireless LAN and connected to the packet network and a control device, the control device performing:

a process to encapsulate a MAC frame received from at least any one of the LAN and the wireless LAN with a packet header including a packet network address including at least a multiplexing identifier and a MAC address and to send the encapsulated packet to the packet network; and a process to send a MAC frame obtained by decapsulating a packet received from the packet network to at least any one of the LAN and the wireless LAN corresponding to a destination of the MAC frame.

7. A non-transitory computer-readable recording medium having stored therein a program for causing a computer to execute a process for multiplexing LANs, the process comprising:

encapsulating a MAC frame received from at least any one of a LAN and the wireless LAN with a packet header including a packet network address including at least a multiplexing identifier and a MAC address;

sending the encapsulated packet to a packet network; and sending a MAC frame obtained by decapsulating a packet received from the packet network to at least any one of the LAN and the wireless LAN corresponding to a destination of the MAC frame.

* * * * *